United States Patent [19]
Dahl et al.

[11] Patent Number: 5,634,661
[45] Date of Patent: Jun. 3, 1997

[54] HYBRID DRIVER SIDE INFLATOR

[75] Inventors: Kim V. Dahl, Clinton; Randall J. Clark, Pleasant View, both of Utah

[73] Assignee: Morton International, Inc., Chicago, Ill.

[21] Appl. No.: 607,669

[22] Filed: Feb. 27, 1996

[51] Int. Cl.$^6$ ................................................ B60R 21/28
[52] U.S. Cl. ............................... 280/741; 280/737
[58] Field of Search ............................ 280/736, 737, 280/741

[56] References Cited

U.S. PATENT DOCUMENTS

| | | | |
|---|---|---|---|
| 4,114,924 | 9/1978 | Kasagi et al. | 280/740 |
| 5,016,914 | 5/1991 | Faigle et al. | 280/741 |
| 5,062,367 | 11/1991 | Hayashi et al. | 102/530 |
| 5,131,680 | 7/1992 | Coultas et al. | 280/737 |
| 5,149,129 | 9/1992 | Unterforsthuber et al. | 280/740 |
| 5,215,721 | 6/1993 | Tasaki et al. | 422/165 |
| 5,217,515 | 6/1993 | Guglielmi | 55/526 |
| 5,219,178 | 6/1993 | Kobari et al. | 280/736 |
| 5,259,643 | 11/1993 | Kraft et al. | 280/740 |
| 5,423,570 | 6/1995 | Kort et al. | 280/741 |
| 5,470,104 | 11/1995 | Smith et al. | 280/741 |
| 5,480,185 | 1/1996 | Lowe et al. | 280/740 |
| 5,487,559 | 1/1996 | Headley | 280/741 |
| 5,487,561 | 1/1996 | Mandzy et al. | 280/741 |

OTHER PUBLICATIONS

Metex Technical Products Division Bulletin TPD-0.
Metex Technical Products Division Bulletin TPD-1.
Metex Technical Products Division Bulletin TPD-3.
Metex Technical Products Division Bulletin TPD-4.
Metex Technical Products Division Bulletin TPD-5.
Metex Technical Products Division Bulletin TPD-6.
Metex Technical Products Division Bulletin MI-56.

*Primary Examiner*—Kenneth R. Rice
*Attorney, Agent, or Firm*—Taylor J. Ross; Gerald K. White

[57] ABSTRACT

A hybrid inflator, suitable for use on the driver side. The inflator includes a disk-shaped housing. Within the housing there is a first chamber for housing a stored gas charge. The housing also includes second chamber housing an initiator and a heating charge. The first chamber containing the stored gas includes a filter and various obstacles to force the hot gas from the second chamber to fully mix with the cool stored gas.

15 Claims, 1 Drawing Sheet

HYBRID DRIVER SIDE INFLATOR

BACKGROUND OF THE INVENTION

1. Field of the Invention

The present invention relates in general to hybrid airbag inflators. In particular, the present invention relates to an improved hybrid inflator, especially suited for use to protect a vehicle driver.

2. Description of the Related Art

Airbag passive restraint systems include an inflator, which produces gas to inflate a cushion. The cushion is then compressed by the occupant to dampen the forces of a collision. Various types of inflators are known, generally classed as pyrotechnic, hybrid, and fluid fueled. Each class of inflator operates on a slightly different principle to produce the inflation gas, and these different principles result in differing operating characteristics. For example, of the three types of inflators noted, hybrid inflators typically result in a faster reduction in gas pressure within the cushion. For certain types of conditions, this is preferable, and as such hybrid inflators are preferred for certain applications.

Beyond the particular type of inflator used, the entire airbag field has a constant desire to reduce size, weight, material costs, part production costs, and assembly costs. For inflators, the use of aluminum helps to reduce weight, and possibly cost. Additionally, the use of impact extrusion has been known to reduce part production costs. Further, to secure the metal inflator components together it is known that inertia welding, where two metal times are pressed together while spinning in opposite directions, can provide cost savings over convention welding techniques such as arc and laser welding.

SUMMARY OF THE INVENTION

An object of the present invention is to provide an airbag inflator which reliably produces inflation gas to inflate a cushion and thus protect the passenger.

A further object of the present invention is to provide such an inflator which is in the class of hybrid inflators.

Yet another object of the present invention is to provide such an inflator which is of sufficiently small size to be mounted to a steering wheel for driver side protection.

Yet another object is to provide such an inflator which is efficient, light weight, and inexpensive.

These and other objects are achieved by a hybrid inflator, suitable for use on the driver side. The inflator includes a disk-shaped housing. Within the housing there is a first chamber for housing a stored gas charge. The housing also includes second chamber housing an initiator and a heating charge. The first chamber containing the stored gas includes a filter and various obstacles to force the hot gas from the second chamber to fully mix with the cool stored gas.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
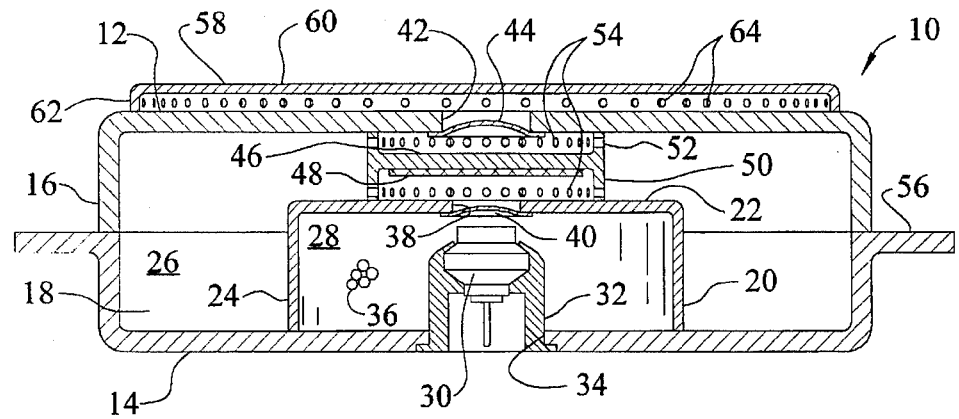
FIGS. 1–3 are cross-sectional side views of inflators according to first through third embodiments, respectively, of the present invention.

With reference to FIG. 1, a first embodiment of an inflator according to the present invention is generally designated by reference numeral 10. As shown, the inflator 10 is of a size and shape commonly used for mounting to a steering wheel to protect the driver of the vehicle (not shown). As such, the inflator takes the general form of a disk, with a housing having a circular top wall 12, a circular bottom wall 14 spaced from the top wall, and a cylindrical side wall 16 extending between the peripheral edges of the top and bottom walls. These walls are preferably formed of stamped steel, although other materials and methods of forming may be employed.

The walls 12–16 define an interior 18 in which the various materials for producing the inflation gas are stored. Within the interior 18 there is mounted a separation dome 20. The dome 20 includes a circular upper wall 22, located between the top and bottom walls 12 and 14 of the housing, and a cylindrical edge wall 24 extending downward from the peripheral edge of the upper wall 22. The diameter of the upper wall is less than that of the top and bottom walls, and as such the edge wall 24 is spaced radially inward from the side wall 16, as will be discussed more fully below. The lower end of the edge wall 24 is fixed to the bottom wall 14 in a gas-tight manner, preferably by welding, and most preferably by inertia welding.

The separation dome 20 divides the interior 18 of the inflator into first and second chambers 26 and 28, with the first chamber being outside the dome, and the second chamber being within the dome. In the first chamber there will be a stored inert gas, such as argon, which is used in inflating the cushion. As is known in the art, however, simply venting a stored gas into a cushion provides poor results. To avoid this, hybrid inflators, as a general class, provide a charge which is ignited to heat the stored gas. In the present invention, this charge is located within the second chamber.

The second chamber is provided with an initiator, or squib, 30. The initiator is secured to a holder 32 which is received in a mounting hole 34, which extends through the bottom wall. The initiator has an electrical connector at its lower end for connection to a controller (not shown) which sends signals to deploy the inflator. Upon receipt of the signal, the initiator creates a brief flash of heat.

Further, the second chamber is provided with a mass of heating material 36. The material 36 (which may be two or more different materials, such as igniter and generant), when subjected to the brief flash of heat from the initiator, produces additional heat, and may also produce an appreciable amount of gas. The production of heat is, however, typically most important.

During assembly of the inflator, a certain amount of air or other gas will be incidentally sealed within the second chamber at atmospheric pressure. When subjected to the heat from the heating material 36, the pressure of this gas rises. This pressure increase would be augmented by the addition of any gas produced by the heating material during its ignition. This hot, high pressure gas is thus initially retained within the second chamber.

To permit the gas to exit, the second chamber is provided with a vent port 38. The vent port takes the form of a through hole in the upper wall 22 of the dome 20. For best results, and as is generally known in the art, it is preferable to seal the vent port until a desired pressure is reached in the second chamber. To this end, the vent port is initially sealed with a burst disk 40.

The disk 40 is formed such that it will fail when subjected to a predetermined pressure. As such, when the pressure within the second chamber reaches the predetermined pressure, the burst disk 40 will rupture, and the hot, high pressure gas will flow from the second chamber to the first chamber 26 in the longitudinal direction.

As noted above, an inert gas is stored in the first chamber under pressure. The hot, high pressure gas from the second chamber will thus mix with this stored gas, resulting in the stored gas reaching a much higher temperature than prior to rupture of the disk 40 (but somewhat cooler than the temperature of the unmixed gas from the second chamber). This higher temperature will, in turn, greatly increase the pressure of the stored gas. This pressure increase is sufficient to provide proper inflation for the airbag cushion.

To permit the (now hot) stored gas to flow from the inflator to the cushion, the top wall 12 of the housing is provided with an exit port 42, in the form of a through hole in the top wall. As with the vent port, it is preferable to maintain the heated stored gas in the inflator until a predetermined pressure is reached. As such, the exit port 42 is provided with a main burst disk 44. As with the previous burst disk, the main disk will fail upon the internal pressure reaching a predetermined pressure. When this internal pressure is reached, the main burst disk fails, and the hot stored gas flows from the inflator.

The above description is all that is strictly required for the hybrid inflator according to the present invention. While this structural arrangement is sufficient for use as described above, there are various details and alternative arrangements which improve the performance of the inflator.

For example, the heating material, or rupturing burst disks, may produce some particulate material which will be entrained in the gas traveling to the cushion. This could injure the passenger. To reduce this possibility, the inflator 10 may be provided with a backstop 46 in spaced, opposed relation to the vent port. While the backstop alone will capture some of the entrained particulate material due to impingement of the material against the backstop, for a further reduction in particulates a filter 48 may be mounted upon the face of the backstop which is opposed to the vent port. As may be envisioned, much if not all of the gas rushing from the second chamber will impinge against the backstop, and pass through the filter 48 if used, before continuing onward. As such, the backstop, and possibly the filter 48, may be used to remove unwanted particulate material from the gas.

In order to maintain the backstop in the desired position, the backstop 46 must of course be secured within the inflator. This may be achieved in a number of ways. As a first example (not shown), the backstop may be formed as a disk having its outer periphery secured, such as by welding, to the inner face of the side wall 16. Appropriate vent holes (not shown) could be provided about the periphery of such a disk, such as between the edge of the filter and the side wall, to permit the gas to pass through the disk toward the exit port. While this is possible, it would be difficult to maintain such a backstop in the desired position during the welding operation, and such a welding operation would typically be conventional, rather than inertia, welding.

To avoid this drawback, and to provide a more economical welding operation, the backstop may be formed as a disk, but with a diameter less than that of the inner face of the side wall 16, such that the peripheral edge of the disk is spaced from the side wall, as shown. To secure the backstop in position, there is provided either, or both, of a lower skirt 50 or upper skirt 52. Each of the lower and upper skirts take the form of a cylinder extending from the peripheral edge of the backstop. The lower skirt 50 would have a length to extend from the backstop to the upper face of the separation dome 20. The lower skirt 50 would of course have a diameter sufficient to encompass the vent port 38 in the dome to ensure that the hot gas reaches the backstop.

In a similar manner, the upper skirt 52 would extend from the backstop to the inner face of the top wall 12. In each case, the skirts 50 and 52 would be provided with a plurality of passages 54 through which the gas could flow to make its way from the second chamber to the exit port. In the embodiment shown, the backstop is provided with both the upper and lower skirts 50 and 52. However, either skirt could be eliminated if desired. Additionally, while the passages could be formed to open upon the free end of the skirts (such that the connection between the skirt and the dome or top wall would have a series of arches in the skirt), it is preferred to form the passages fully within the skirt, as shown.

The reason for this preferred passage form is ease of assembly. Specifically, if the passages are formed fully in the skirt, the free edge of the skirt is a continuous circle. This permits the skirt to be secured to the dome or top wall by the use of inertia welding. Inertia welding provides advantages in both time and cost compared to traditional arc or laser welding.

Such inertia welding can be used to advantage to assemble much of the inflator of FIG. 1. For example, the top, bottom and side walls 12–16 would initially be formed in two pieces to provide access to the interior 18. In the embodiment shown, this is achieved by splitting the sidewall between the top and bottom walls, forming two concave bowl-shaped halves which may each be easily produced by stamping, forging, impact extrusion, drawing, etc. As shown, the lower half includes a mounting flange 56 extending radially outward from the upper edge thereof.

This lower half may first be combined with initiator by securing the holder 32 in the mounting hole 34, with the initiator secured to the holder before or after this step. Thereafter, the separation dome 20 is secured to the inner face of the bottom wall using inertia welding. It is noted that the heating material 36 for the second chamber would preferably be held within the dome 20 (typically by use of a thin metal bracket or cover plate) during the placement and inertial welding of the dome to the bottom wall. At this point the backstop may be attached. If the backstop contains only one skirt, that skirt is then inertia welded to the appropriate component. Specifically, if only the lower skirt is provided, the lower skirt is inertia welded to the outer face of the separation dome. If only the upper skirt is provided, the upper skirt is inertia welded to the inner face of the top wall 12. Of course, if both skirts are provided, either operation may be used.

Thereafter, the halves of the sidewall may be joined together. Again, this may be accomplished using inertia welding. Additionally, if the backstop is provided with both the lower and upper skirts, as shown, this operation simultaneously inertia welds the unattached skirt to the dome 20 or top wall 12. With this operation, all inertia welds are complete. Additionally, it is possible to perform this step using an atmosphere of the pressurized inert gas. This will automatically provide the stored gas in the first chamber 26 upon completion of this step.

At this time the inflator 10 is complete, if the first chamber has received its charge of gas during the inertia welding. If not, the final step is to charge the first chamber with the inert gas. This may be achieved via an appropriate charge hole (not shown) in a manner known in the art.

From the above description it should be clear that the present invention provides a hybrid inflator which will provide reliable performance, may be used in a driver side application, and which may be easily assembled using mainly low cost inertia welding techniques. Furthermore, the inflator provides the ability to filter the heating gas, reducing the amount of particulate and thus producing a safer inflator. Additionally, the use of either skirt 56 or 58, and especially using both skirts, for mounting of the backstop provides improved mixing of the gas.

This is due to the tortuous path that is forced upon the gas by the backstop and skirt(s). Specifically, the longitudinally flowing gas from the second chamber must change direction 90° to flow radially outward over the filter and backstop. Since the passages 54 are located adjacent the lower end of the skirt, the gas must then change direction 90° to flow downward (reverse longitudinal flow), and then another 90° change to be forced radially through the passages 54 in the lower skirt. The gas must then change direction 90° again to flow axially upward toward the exit port 42, and then change direction 90° further to travel radially inward through the passages 54 in the upper skirt before reaching the exit port, where a final 90° direction change is required to flow axially from the inflator housing. A total of six 90° direction changes (540°) are thus required of the gas between the second chamber and the exit port.

Additional tortuous flow can be achieved even after the gas leaves the exit port 42. Specifically, the inflator 10 may be provided with a diffuser 58. The diffuser includes a disk-shaped outer wall 60 spaced from the top wall 12 of the housing, and a cylindrical peripheral wall 62 extending downward from the outer wall. This peripheral wall has a diameter equal to, or less than, that of the top wall 12. As may be realized from the previous assembly discussion, the diffuser may be readily assembled to the outer face of the top wall 12 by the use of inertia welding.

The peripheral wall 62 of the diffuser includes a plurality of radial vents 64 extending therethrough. The gas flowing from the exit port 42 will thus impinge upon the outer wall 60 and be mined 90° to flow radially outward through the radial vents. In addition to enhancing tortuous flow, thus also results in a safer thrust-neutral inflator. This tortuous flow throughout the inflator creates improved mixing of the heating gas and stored gas, ensuring greater pressures with lesser amounts of heating material.

As may be seen, the present inflator in a hybrid form provides ease of assembly using a majority of inertia welds, and is efficient due to the creation of tortuous flow paths. As such, the present invention is believed to be an advantageous arrangement. Additionally, if both skirts are employed, the skirts and separation dome serve to reinforce the housing, an important consideration since the housing will contain the stored gas under pressure. Use of both skirts strengthens the housing, permitting the use of thinner materials and/or greater stored gas pressures. These greater gas pressures allow the use of a smaller inflator. As such, the present inflator may be sized to fit within the steering wheel, and is therefore suitable for use as a driver side inflator.

This first embodiment is capable of variation. For example, the diameter of the backstop, and thus the skirts, may be varied, up to the point that the skirts have the same diameter as the edge wall 24 of the dome 20. Further, while the backstop has been shown with both skirts, the dome 20 could be modified to include an upstanding skirt forming the lower skirt 50, connecting to the backstop 46. With this variation the dome would have an H-shaped cross-section similar to that shown for the backstop and skirts, while the backstop (if provided with the upper skirt) would actually form a dome similar to the separation dome 20 shown.

Figure 2:
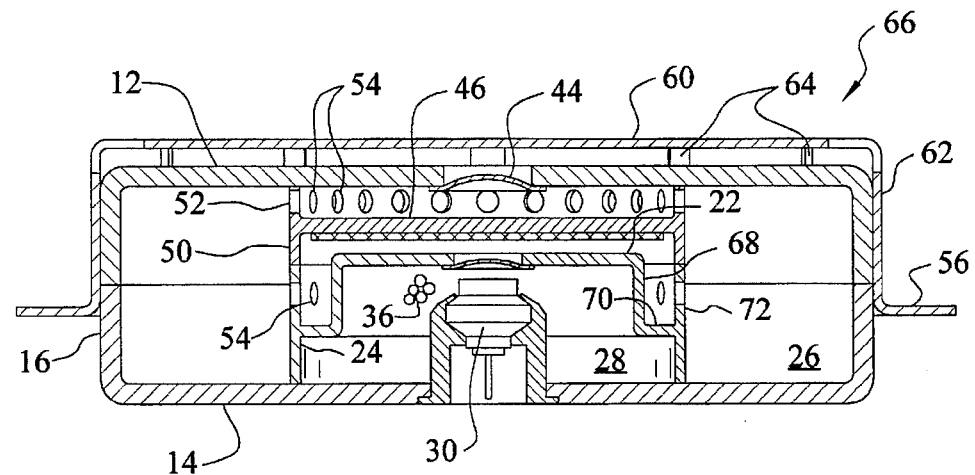

With reference to FIG. 2, a second embodiment of an inflator according to the present invention is shown, and is generally designated by reference numeral 66. This inflator is mainly identical to the first embodiment, and like elements are designated with like reference numerals.

The difference between the first and second embodiments is the form of the dome 20, and possibly the lower skirt 50 of the backstop 46. In particular, the edge wall 24 of the dome 20 is formed with a radially inward offset section 68 adjacent the upper wall 22. This offset section 68 results in the upper wall 22 having a diameter less than that of the lower skirt 50. The offset section also forms an upward facing shoulder 70 about the periphery of the dome, in opposed relation to the lower skirt.

The lower skirt 50 of the backstop may therefore be extended downward to abut against the shoulder 70. While this alone does not enhance performance, the increased length of the lower skirt permits the passages 54 to be moved downward also, preferably such that the entire passage is below the level of the upper wall 22. This arrangement further enhances the requirement that the gas flowing radially outward from the backstop must turn 90° downward (reverse longitudinal flow) and then 90° radially outward to exit the passages 54 in the lower skirt. As may be seen, this increases the mixing of the hot gas and the stored gas, increasing efficiency. Additionally, the passages in the lower skirt are much lower with respect to the side wall 16 compared to the first embodiment. Again, this increases mixing of the gases and efficiency by increasing the distance the hot gas must travel to the exit port.

In the embodiment shown in FIG. 2, the lower skirt itself does not extend fully to the shoulder, but rather a skirt extension 72 extends upward from the shoulder and abuts against the lower skirt, with the extension 72 containing the passages 54. Either arrangement is acceptable, even to the point of the extension rising all the way to the backstop, and forming the entire lower skirt. Regardless of the particular arrangement used, inertia welding is still suitable for securing the lower skirt 50 to the shoulder 70 (or the lower skirt to the extension 72, or the extension 72 to the backstop 46).

The embodiment of FIG. 2 also differs in the details of the diffuser. In this embodiment, the diffuser peripheral wall 62 has a diameter slightly greater than that of the side wall 16, and extends downward over a portion of the side wall. As in the first embodiment, the peripheral wall includes a plurality of radial vents 64. The peripheral wall and side wall are fixed together, such as by laser welding. The lower end of the peripheral wall is flared outward to create the mounting flange 56.

As may be seen, the second embodiment provides improved mixing and efficiency compared to the first embodiment.

Figure 3:
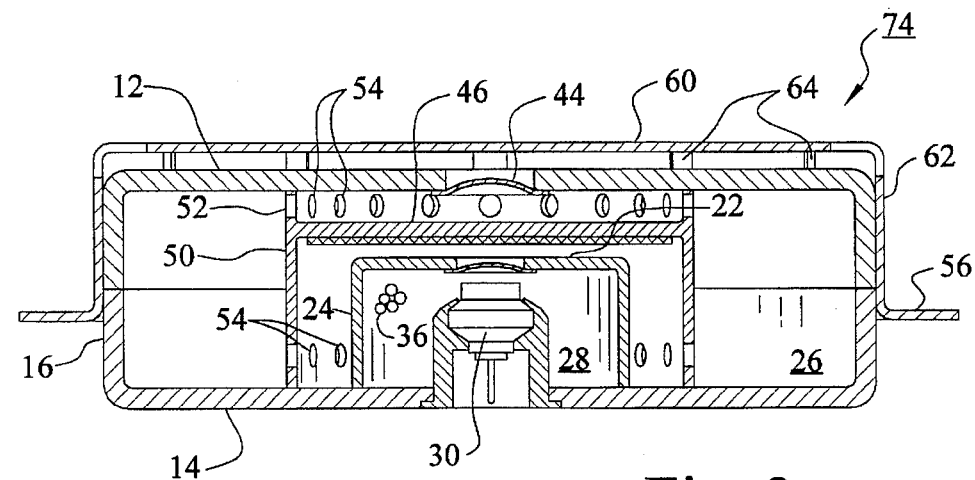

With reference to FIG. 3, a third embodiment of an inflator according to the present invention is shown, and is generally designated by reference numeral 74. This embodiment is again similar to the previous embodiments, except in the details of the lower skirt. As before, one or both of the skins 50 and 52 are necessary to hold the backstop in position, and both are again preferred. The upper skin 52 is similar to previous embodiments, and may be readily secured to the inner face of the top wall 12 of the housing using inertia welding. While the lower skirt could be eliminated, its use is preferred for its creation of tortuous gas flow. In this embodiment, therefore, the lower skirt has a diameter greater than the extent of the dome. In this manner, the skin may extend below the level of the dome end wall 22.

This will permit a full circular end at the bottom of the lower skin, suitable for inertia welding to the bottom wall 14 of the housing, as shown. Furthermore, since the lower skirt extends all the way to the bottom wall, the passages 54 through the lower skin may be placed even lower, increasing the distance the hot gas travels to exit the inflator.

In addition to the increase in efficiency due to this increased gas flow distance, this fourth embodiment is perhaps the easiest to assemble, since the lower skirt is secured to the lower wall 16 rather than the dome. First, the there is no need to ensure alignment between the lower skirt and any extension 72. Second, there is no concern that the inertia welding will cause high temperatures in the dome which could ignite the heating material 36.

During assembly, the initiator and dome are mounted as before. Thereafter the upper or lower skirt of the backstop is inertia welded to the appropriate one of the top or bottom wall of the housing. Thereafter, the two halves of the housing are inertia welded together, simultaneously inertia welding the remaining one of the upper or lower skirt. Pressurization of the first chamber, if not done in the previous step, then completes the assembly.

It is noted that a backstop having an increased diameter, such that the lower skirt may extend to the bottom wall of the housing, is a modification available on the first two embodiments also. A further modification is to eliminate the passages 54 in the lower skirt, and simply have the bottom, free, end of the lower skirt be spaced from the bottom wall by a small amount. This spacing would then form a single passage about the entire periphery. This would not provide as secure a mounting for the lower skirt, however it may be sufficiently secure, and would eliminate the cost of forming the multiple passages through the lower skirt. This is not preferred, however, since the strength benefits of the skirts (noted above) will not be realized.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A hybrid airbag inflator, comprising:

a housing defining an interior, an exit port in said housing, said port accessing said interior, said interior being divided into first and second chambers, said second chamber having a vent port for directing heating gas from said second chamber in a longitudinal direction;

a pressurized inert gas stored in said first chamber;

a heating material stored in said second chamber to create said heating gas;

a gas impermeable member mounted in longitudinally spaced, opposed relation to said vent port, to thereby force radial flow of said heating gas;

a skirt having an upper end at least in proximity to said member, and a lower end extending toward said vent port, said skirt having a periphery encompassing at least said vent port to thereby block at least a substantial portion of said radial flow, and force reverse longitudinal flow of said heating gas subsequent to impingement upon said member.

2. An inflator as in claim 1, wherein said skirt periphery is spaced from said housing, and said exit port is longitudinally spaced from said lower end of said skirt, to thereby force longitudinal flow of said gas between said skirt and said housing subsequent to exiting said skirt.

3. An inflator as in claim 2, wherein said skirt includes a plurality of passages therethrough adjacent said lower end.

4. An inflator as in claim 2, wherein said gas impermeable member is a backstop positioned longitudinally intermediate said exit port and said vent ports, and said skirt extends from said backstop.

5. An inflator as in claim 4, wherein said skirt comprises a lower skirt, and further comprising an upper skirt extending from said backstop toward said exit port, said upper skirt including a plurality of passages therethrough.

6. An inflator as in claim 4, wherein said skirt extends to said housing to thereby encompass said vent port, and said skirt includes a plurality of passages therethrough adjacent said lower end.

7. An inflator as in claim 6, wherein said second chamber is defined by a dome fixed to said housing.

8. An inflator as in claim 6, further including a diffuser mounted downstream of said exit port.

9. An inflator as in claim 8, wherein said housing includes a circular top wall, a circular bottom wall spaced from said top wall, and a cylindrical side wall extending between peripheral edges of said top and bottom walls, said walls being sized for placement upon a steering wheel of a vehicle, and wherein said exit port is located in said top wall, and said dome and said lower end of said skirt are mounted to said bottom wall.

10. An inflator as in claim 9, wherein said skirt comprises a lower skirt, and further comprising an upper skirt extending from said backstop toward said exit port, said upper skirt including a plurality of passages therethrough.

11. An inflator as in claim 4, further including a separation dome mounted in said housing, said first chamber being exterior of said dome, and the volume within said dome defining said second chamber.

12. An inflator as in claim 11, wherein said dome includes an upwardly facing shoulder, and a dome extension extending upward from said shoulder, said dome extension abutting said lower end of said skirt, and further including a plurality of passages extending through said dome extension.

13. An inflator as in claim 12, further including a diffuser mounted downstream of said exit port.

14. An inflator as in claim 12, wherein said housing includes a circular top wall, a circular bottom wall spaced from said top wall, and a cylindrical side wall extending between peripheral edges of said top and bottom walls, said walls being sized for placement upon a steering wheel of a vehicle, and wherein said exit port is located in said top wall, and said dome is mounted to said bottom wall.

15. An inflator as in claim 12, wherein said skirt comprises a lower skirt, and further comprising an upper skirt extending from said backstop toward said exit port, said upper skirt including a plurality of passages therethrough.

* * * * *

UNITED STATES PATENT AND TRADEMARK OFFICE
CERTIFICATE OF CORRECTION

PATENT NO.   : 5,634,661
DATED        : 3 June 1997
INVENTOR(S)  : Kim V. Dahl and Randall J. Clark It is certified that error appears in the above-indentified patent and that said Letters Patent is hereby corrected as shown below:

At column 1, line 29, "two metal times" should be
                     --two metal items--.

At column 5, line 40, "mined 90°" should be
                     --turned 90°--.

Signed and Sealed this

Twenty-first Day of October 1997

Attest:

BRUCE LEHMAN

*Attesting Officer*           *Commissioner of Patents and Trademarks*